Oct. 2, 1962     J. W. HEIMASTER ETAL     3,056,952

EARTH STRATA-HARDNESS RESPONSIVE MEANS

Filed Nov. 10, 1958     3 Sheets-Sheet 1

INVENTORS
JOHN W. HEIMASTER
JOHN R. MILLER

BY Barnwell R. King
ATTORNEY

INVENTORS
JOHN W. HEIMASTER
JOHN R. MILLER
BY Barnwell R. King
ATTORNEY

Oct. 2, 1962     J. W. HEIMASTER ETAL     3,056,952
EARTH STRATA-HARDNESS RESPONSIVE MEANS
Filed Nov. 10, 1958     3 Sheets-Sheet 3

INVENTORS
JOHN W. HEIMASTER
JOHN R. MILLER
BY *Barnwell R. King*
ATTORNEY 3,056,952
EARTH STRATA-HARDNESS RESPONSIVE MEANS
John W. Heimaster, Charleston, and John R. Miller, St. Albans, W. Va., assignors to Union Carbide Corporation, a corporation of New York
Filed Nov. 10, 1958, Ser. No. 772,770
10 Claims. (Cl. 340—261)

This invention relates to improvements in earth strata-hardness responsive means, and more particularly to continuously responsive strata hardness-sensing systems for continuous mining machines.

In U.S. Patent No. 2,752,591 there is disclosed a system for continuously indicating the relative hardness of the strata being cut by a continuous mining machine, such as that shown in Patent No. 2,862,402, in which the relative torque or force applied to the strata cutting tooth in cutting in situ earth materials of different hardness causes relative mechanical movement of the strata cutting tooth mounting. This movement is transformed into electrical signals, the relative amplitude of which corresponds to the relative hardness of the earth strata being cut. Such prior devices contained a multitude of parts, such as bearings, levers, springs, etc., some of which move quite rapidly, generating high inertia forces.

The main objects of the present invention are to simplify the construction, lower the maintenance costs, and minimize the inertia forces of such devices.

According to this invention these objects are accomplished and new and unexpected results are obtained by mounting the movable elements in coaxial relationship so that many parts including bearings, levers, and springs are eliminated, and inertia forces are kept low by concentrating moving parts near the axis of rotation.

More specifically the invention provides a strata-hardness responsive device comprising a housing mounted on a rotary cutting head for mining coal, for example. Such housing rotates with such cutting head about the axis of the head. Located within such housing is a shaft provided with an external cutting tooth for imparting relatively rotary motion to the shaft, about its longitudinal axis, the latter being deposed in eccentric but substantially parallel relation to that of the head. Resistance to such motion of the shaft in the housing is provided by a novel elongated torsion member which is located within the housing in coaxial relationship with such shaft therein. Also located within such housing to the rear of such torsion member is an electrical transducer which is connected to the shaft for measuring such rotary motion, which indicates on a stratascope the relative hardness of coal, for example, cut by the cutting tooth as it rotates around the periphery of the hole bored by the cutting head.

In one form of the invention the transducer is of the rotary electro-magnetic type; in another form it is of the electro-static type. It is to be understood that the so-called rotary motion of the shaft in the torsion member is restricted to a relatively short arc by the torsion member.

Figure 1:
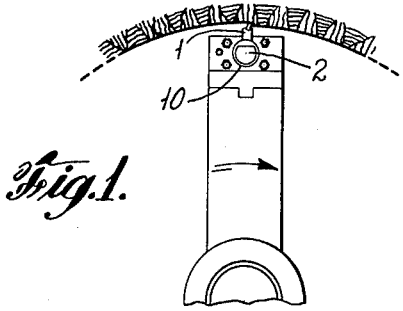
FIGS. 1 and 2 are front elevational and side elevational views, respectively, of a preferred modification of the invention.
Figure 2:
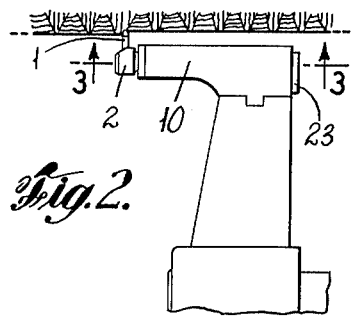
Figure 3:
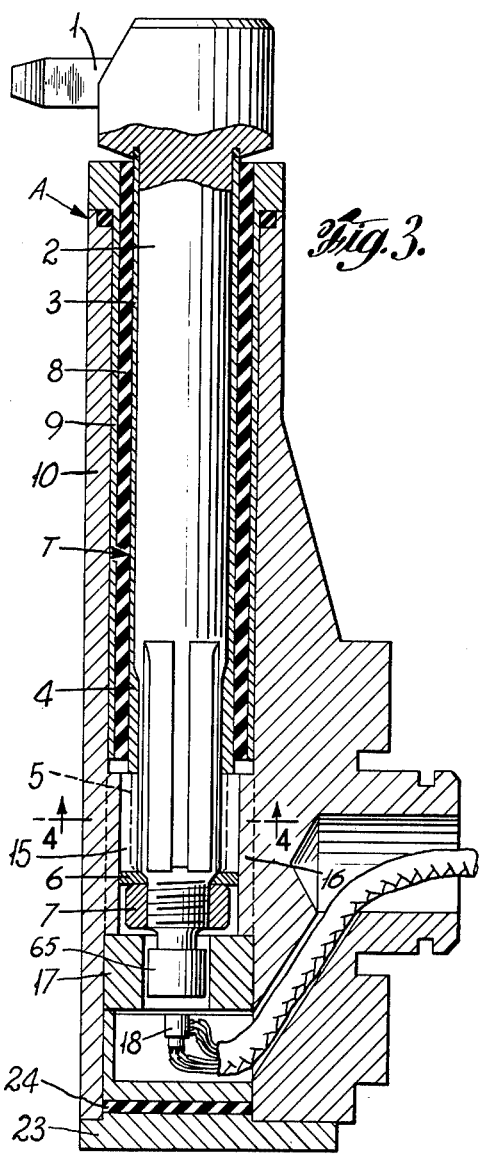
FIG. 3 is a cross-sectional view taken on the line 3—3 of FIG. 2.
Figure 4:
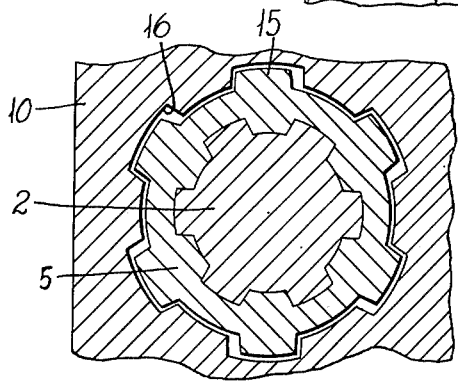
FIG. 4 is an enlarged cross-sectional view of the rotational stop taken on line 4—4 of FIG. 3.

As shown in FIG. 3, a cutting-scanning tooth 1 is transversely mounted rigidly on the outer end of a shaft 2, which in turn is rigidly secured to an inner tube 3 of a torsion member T by splines 4, stop washer 5, flat washer 6, and nut 7. The inner tube 3 of the torsion member is bonded by means of an elongated cylindrical resilient rubber member or bushing 8 to an outer tube 9 of the torsion member. These parts, 1 through 9, constitute a readily replaceable assembly A, which is secured to a housing 10 carried by the rotary cutting head of a mining machine.

This device eliminates bearings, levers, springs, etc., in the device of U.S. Patent No. 2,752,591 by mounting all moving parts in the bonded rubber torsion mount, which is readily replaced as a unit. This device also has very little inertia. Gaskets seal against the entrance of water and foreign matter into the housing.

Male splines 15 on the outside of the stop washer 5 engage loosely in female splines 16 on the inside of the housing 10 to limit torsional displacement of inner tube 3 with respect to outer tube 9. A rotor 65 consisting of a flattened section at the inner end of shaft 2 is located within the magnetic field generated by the coils 66 of the stator 67 of a rotary transducer 17. Plate 23 and gasket 24 seal against the entrance of water and foreign matter at the bottom of the housing.

Figure 5:
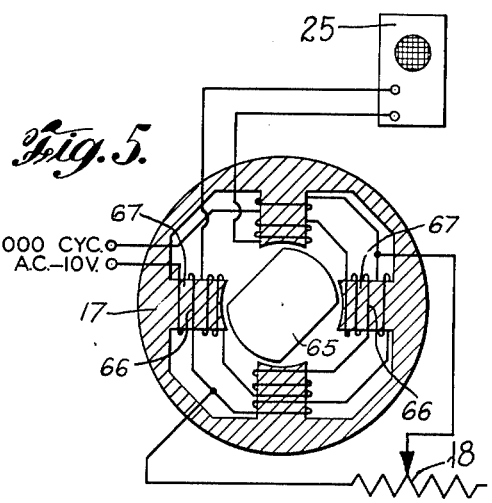
FIG. 5 is a wiring diagram of one form of the invention.

Limited movement of the shaft 2 on its longitudinal axis due to cutting loads applied to the cutter-scanner tooth 1 by the resistance of the earth strata are converted into electrical signals by the transducer 17, the relative amplitude of such electrical signals being proportional to the relative torque applied to the tooth. Such electrical signals are used to control the operation of the mining machine, as disclosed in copending application Serial No. 738,098, filed May 27, 1958, and also are reproduced on the screen of an oscilloscope 25, FIG. 5. Variable resistor 18 is used to adjust the output of the rotary transducer to a near-zero value when no torque is being applied.

Figure 7:
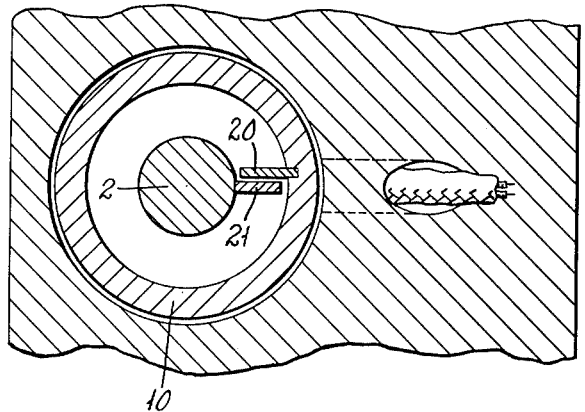
FIG. 7 is an enlarged cross-sectional view of a modification of the variable capacitor of the invention.

In a modified version of such device, the rotary transducer comprises a variable capacitor, consisting of a stator comprising fixed plate 20 and a rotor comprising movable plate 21, FIG. 7. Rotation of the shaft 2 changes the capacitance of such variable capacitor by changing the spacing between plates 20 and 21.

Figure 6:
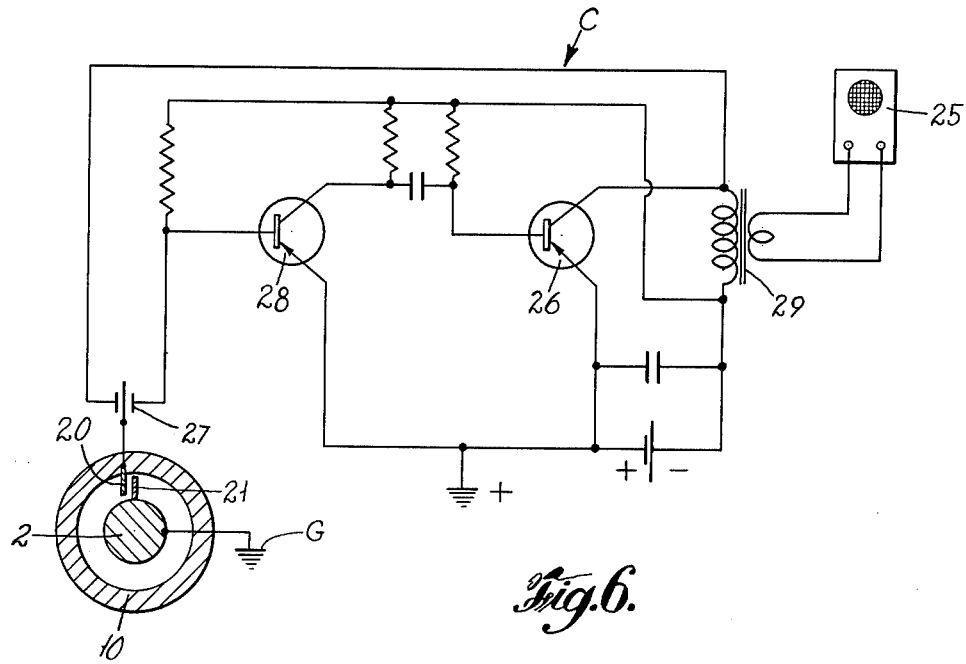
FIG. 6 is a wiring diagram of a modification of the invention.

FIG. 6 is a wiring diagram of a modified form of the invention in which an oscillator circuit C includes the variable capacitor formed by plates 20 and 21. Part of the output of transistor 26 is returned through capacitor 27 to transistor 28, thus causing the circuit to oscillate. The center plate of capacitor 27 is connected to fixed plate 20 of the variable capacitor, the movable plate 21 being connected to ground G. A portion of the output of transistor 26 is thus bled off to ground, and does not reach transistor 28. Thus a change in capacitance of the variable capacitor causes a change in the amount of the regenerative input to transistor 28, with a resultant change in the output of transistor 26. This output, after passing through transformer 29, is used to control the operation of the mining machine, as disclosed in copending application Serial No. 738,098, filed May 27, 1958, and is shown on the screen of the oscilloscope 25. Since movable plate 21 moves in response to rotation of shaft 2, FIG. 7, the trace upon the screen of oscilloscope 25 varies in direct proportion to the relative hardness of the strata being cut by cutter-scanner tooth 1, FIG. 3.

Figure 8:
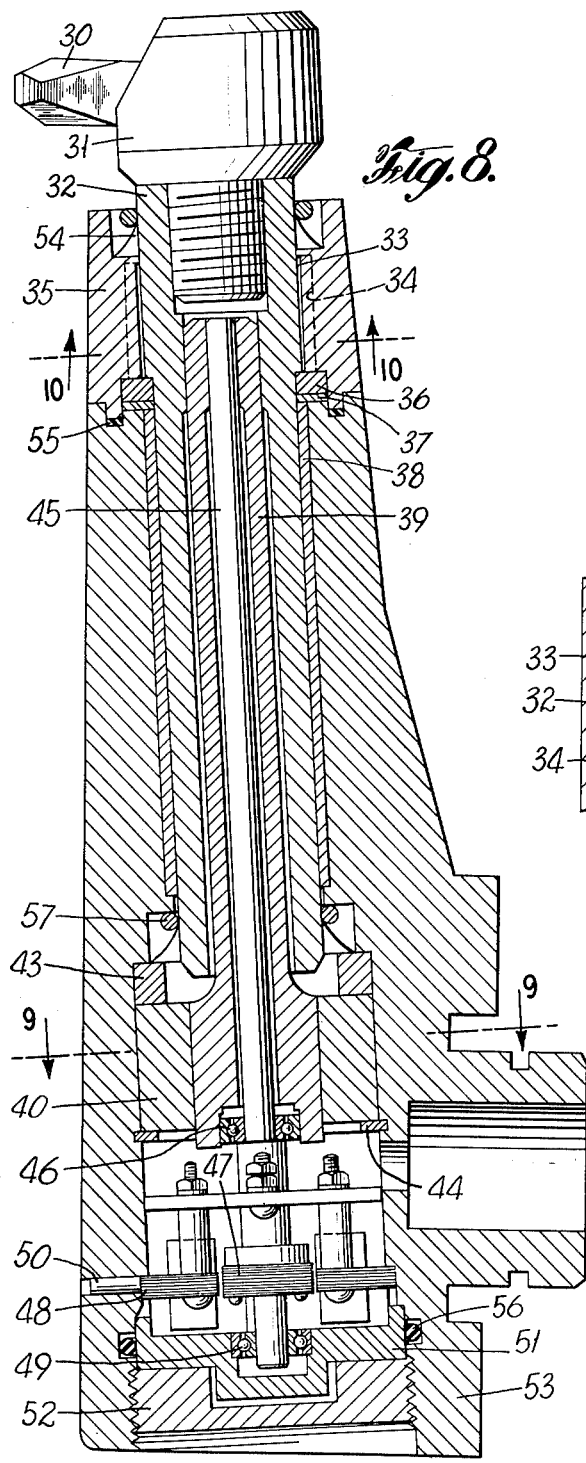
FIG. 8 is a cross-sectional view of still another modification of the invention.
Figure 10:
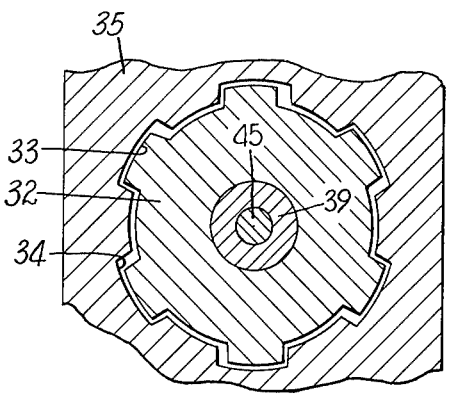
FIG. 10 is a cross-sectional view taken on the line 10—10 of FIG. 8.

FIG. 8 shows still another form of the invention in which the cutter-scanner tooth 30 is mounted in a removable head 31, which screws into main shaft 32. Main shaft 32 has integral male splines 33 cooperating with loose fitting female splines 34 in cap 35 to form a rotational stop, FIG. 10. Washers 36 and 37 serve to absorb any axial thrust. Bushing 38 serves as the radial bearing for main shaft 32.

Figure 9:
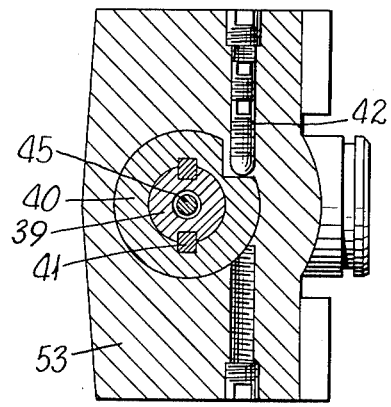
FIG. 9 is a cross-sectional view taken on the line 9—9 of FIG. 8.

Attached coaxially to main shaft 32 is torsion element 39, which is firmly attached to anchor ring 40 by keys 41, FIG. 9. Anchor 40 can be rotated by screw 42 to provide any desired value of pretorsion in torsion element 39. Spacer 43 and snap ring 44 serve to locate anchor ring 40 axially.

Indicator rod 45 is attached coaxially to torsion element 39 at the top, and is guided by bearing 46 near the bottom. Attached to indicator rod 45 is the core 47 of a rotary transducer 48. Bearing 49 serves to radially locate the lower end of indicator rod 45. Pin 50 restrains rotary transducer 48 against angular displacement, while spacer 51 and nut 52 clamp it firmly against a shoulder in housing 53.

Oil seal 54, gasket 55, and O-ring 56, seal against the entrance of water and foreign matter. Oil seal 57 prevents grease used to lubricate bushing 38 from entering the section in which rotary transducer 48 is located.

Rotation of main shaft 32, due to cutting loads applied to cutter-scanner tooth 30 by the resistance of the earth strata, is resisted by torsional loads developed in torsion element 39. Angular displacement of main shaft 32 is thus proportional to the relative torque applied to tooth 30. Indicator rod 45 rotates with main shaft 32, thus transmitting this angular displacement to the core of rotary transducer 48. Thus electrical signals are generated in rotary transducer 48 whose amplitude is directly proportional to the cutting loads applied by the resistance of the earth strata and, consequently, directly proportional to the relative hardness of such strata.

The invention is used in the same manner as the earth strata cutting indicator disclosed in U.S. Patent No. 2,752,591, as well as for automatically controlling the operation of a mining machine, as disclosed in application Serial No. 738,098.

What is claimed is:

1. A strata-hardness responsive device comprising a housing, a shaft extending into said housing, a transverse cutting tooth for imparting rotary motion to said shaft about the longitudinal axis thereof, a resilient torsion member coaxial with said shaft for resisting such motion, and an electrical transducer located within said housing and connected to said shaft for measuring such rotary motion.

2. A strata-hardness responsive device as defined by claim 1, in which said transducer is provided with a rotor responsive to rotary motion of said shaft.

3. A strata-hardness responsive device as defined by claim 2, in which said rotor is electromagnetically coupled to a stator.

4. A strata-hardness responsive device as defined by claim 2, in which said rotor is a plate of a condenser having a plate mounted on said housing.

5. A strata-hardness responsive device as defined by claim 1, in which loose fitting splines are provided between said housing and shaft to act as rotational stops.

6. In a device as defined by claim 1, in which a head is removably connected to the outer end of said shaft for carrying said tooth.

7. A strata-hardness responsive device, as defined by claim 1, in which said resilient torsion member is provided with coaxial tubes bonded thereto.

8. In a strata-hardness responsive device, a housing comprising an elongated cylindrical chamber, a cylindrical torsion assembly removably secured within said chamber including an outer tube connected to said housing, a cylindrical rubber torsion element bonded to the inside of said outer tube, and an inner tube bonded to said element, a shaft extending through and connected to said inner tube, a lateral cutting tooth removably secured to the outer end of said shaft and extending transversely thereof for imparting strata-hardness responsive oscillatory motion to said shaft about its longitudinal axis, and a rotary transducer mounted in said chamber and connected to the inner end of said shaft for picking up the strata-hardness oscillatory motion about the longitudinal axis of said shaft imparted thereto by said transverse cutting tooth.

9. In a device as defined by claim 8, in which loosely fitting male and female splines on said housing and shaft, respectively, are provided for limiting torsional displacement of said inner tube.

10. In a device as defined by claim 8, in which means are provided for sealing the entire interior of said cylindrical chamber and the shaft and torsion assembly and rotary transducer therein against the entrance of water and other foreign matter during operation of the device.

References Cited in the file of this patent

UNITED STATES PATENTS

| | | |
|---|---|---|
| 2,193,079 | Schrader | Mar. 12, 1940 |
| 2,363,611 | Newell | Nov. 28, 1944 |
| 2,396,540 | Stansfield | Mar. 12, 1946 |
| 2,409,876 | Martin et al. | Oct. 22, 1946 |
| 2,620,386 | Alspaugh et al. | Dec. 2, 1952 |
| 2,752,591 | Felbeck et al. | June 24, 1956 |
| 2,915,896 | Booth et al. | Dec. 8, 1959 |
| 2,942,457 | Sink | June 28, 1960 |